United States Patent
Rosenberg et al.

(10) Patent No.: US 12,499,870 B2
(45) Date of Patent: Dec. 16, 2025

(54) GUIDED DATA SELECTION FOR MASKED SPEECH MODELING BASED ON AN AVERAGE SCORE ASSIGNED TO ENCODED REPRESENTATIONS OF AN UTTERANCE

(71) Applicant: Google LLC, Mountain View, CA (US)

(72) Inventors: Andrew Rosenberg, Brooklyn, NY (US); Bhuvana Ramabhadran, Mt. Kisco, NY (US); Yu Zhang, Mountain View, CA (US); Murali Karthick Baskar, Mountain View, CA (US)

(73) Assignee: Google LLC, Mountain View, CA (US)

( * ) Notice: Subject to any disclaimer, the term of this patent is extended or adjusted under 35 U.S.C. 154(b) by 349 days.

(21) Appl. No.: 17/820,871

(22) Filed: Aug. 18, 2022

(65) Prior Publication Data

US 2023/0103722 A1 Apr. 6, 2023

Related U.S. Application Data

(60) Provisional application No. 63/262,136, filed on Oct. 5, 2021.

(51) Int. Cl.
*G10L 15/06* (2013.01)
*G06N 3/0455* (2023.01)
(Continued)

(52) U.S. Cl.
CPC ............ *G10L 15/063* (2013.01); *G10L 15/02* (2013.01); *G10L 15/08* (2013.01); *G06N 3/0455* (2023.01)

(58) Field of Classification Search
CPC ....... G10L 15/063; G10L 15/02; G10L 15/08; G10L 13/00; G10L 15/16
See application file for complete search history.

(56) References Cited

U.S. PATENT DOCUMENTS

| | | | |
|---|---|---|---|
| 10,332,508 B1 * | 6/2019 | Hoffmeister | G06N 3/08 |
| 11,551,668 B1 * | 1/2023 | Baevski | G06F 18/2155 |

(Continued)

FOREIGN PATENT DOCUMENTS

| CN | 113823265 A | * | 7/2021 | ............. | G10L 15/02 |

OTHER PUBLICATIONS

Wang et al., "Semantic Mask for Transformer based End-to-End Speech Recognition" Mar. 16, 2020 (Year: 2020).*

(Continued)

*Primary Examiner* — Farzad Kazeminezhad
(74) *Attorney, Agent, or Firm* — Honigman LLP; Brett A. Krueger; Grant Griffith

(57) ABSTRACT

A method of guided data selection for masked speech modeling includes obtaining a sequence of encoded representations corresponding to an utterance. For each respective encoded representation, the method includes processing the respective encoded representation to generate a corresponding probability distribution over possible speech recognition hypotheses and assigning, to the respective encode representation, a confidence score as a highest probability from the corresponding probability distribution over possible speech recognition hypotheses. The method also includes selecting a set of unmasked encoded representations to mask based on the confidence scores assigned to the sequence of encoded representations. The method also includes generating a set of masked encoded representations by masking the selected set of unmasked encoded representations. Here, each masked encoded representation in the set of masked encoded representations corresponds to a respective one of the unmasked encoded representations in the selected set of unmasked encoded representations.

20 Claims, 8 Drawing Sheets

(51) Int. Cl.
  *G10L 13/00* (2006.01)
  *G10L 15/02* (2006.01)
  *G10L 15/08* (2006.01)
  *G10L 15/16* (2006.01)

(56) References Cited

U.S. PATENT DOCUMENTS

| | | | | |
|---|---|---|---|---|
| 2019/0332919 | A1* | 10/2019 | Weiss | G06N 3/045 |
| 2021/0035563 | A1* | 2/2021 | Cartwright | G06N 3/084 |
| 2021/0104245 | A1* | 4/2021 | Aguilar Alas | G10L 15/16 |
| 2021/0174798 | A1* | 6/2021 | Wu | G06F 18/2148 |

OTHER PUBLICATIONS

Baevski et al., "Effectiveness of Self-Supervised Pre-Training for ASR", 2020 (Year: 2020).*

International Search Report and Written Opinion relating to Applicaiton No. PCT/US2022/075182, dated Nov. 21, 2022.

Chengyi Wang et al: "Semantic Mask for Transformer based End-to-End Speech Recognition", arxiv.org <http://arxiv.org>, Cornell University Library, 201 Olin Library Cornell University Ithaca, NY 14853, Dec. 6, 2019 (Dec. 6, 2019), XP081546549, abstract paragraphs 1, 2, 3, 4 figures 1,2,3.

Kumar Kshitiz et al: "Word Characters and Phone Pronunciation Embedding for ASR Confidence Classifier", ICASSP 2019—2019 IEEE International Conference on Acoustics, Speech, and Signal Processing : Proceedings : May 12-17, 2019, Brighton Conference Centre, Brighton, United Kingdom, IEEE, US, Jan. 1, 2019 (Jan. 1, 2019), pp. 2712-2716, XP033565111, DOI: 10.1109/ICASSP.2019. 8682579 ISBN: 978-1-4799-8131-1 [retrieved on Apr. 17, 2019] Abstract paragraph 3.1 figure 2.

Singh Sushant et al: "The NLP Cookbook: Modern Recipes for Transformer Based Deep Learning Architectures", IEEE Access, IEEE, USA, vol. 9, May 4, 2021 (May 4, 2021), pp. 68675-68702, XP011854469, DOI: 10.1109/ACCESS.2021.3077350 [retrieved on May 12, 2021] p. 68681, paragraph D figure 7.

Ma Edward:"Data Augmentation for Speech Recognition", Towards Data Science, May 1, 2019 (May 1, 2019), XP055965178, Retrieved from the Internet: URL:<https://towardsdatascience.com/data-au>gmentation -for -speech -recognition -e7c60748 2e78 [retrieved on Sep. 27, 2022] the whole document.

* cited by examiner

GUIDED DATA SELECTION FOR MASKED SPEECH MODELING BASED ON AN AVERAGE SCORE ASSIGNED TO ENCODED REPRESENTATIONS OF AN UTTERANCE

CROSS REFERENCE TO RELATED APPLICATIONS

This U.S. patent application claims priority under 35 U.S.C. § 119(e) to U.S. Provisional Application 63/262,136, filed on Oct. 5, 2021. The disclosure of this prior application is considered part of the disclosure of this application and is hereby incorporated by reference in its entirety.

TECHNICAL FIELD

This disclosure relates to guided data selection for masked speech modeling.

BACKGROUND

Automatic speech recognition (ASR), the process of taking an audio input and transcribing it into text, has greatly been an important technology that is used in mobile devices and other devices. In general, automatic speech recognition attempts to provide accurate transcriptions of what a person has said by taking an audio input (e.g., speech utterance) and transcribing the audio input into text. Modern ASR models continue to improve in both accuracy (e.g., a low word error rate (WER)) and latency (e.g., delay between the user speaking and the transcription) based on the ongoing development of deep neural networks. However, one challenge in developing deep learning-based ASR models is that parameters of the ASR models tend to over fit the training data, thereby resulting in the ASR models having difficulties generalizing unseen data when the training data is not extensive enough. As a result, training ASR models on larger training datasets improves the accuracy of the ASR model. Synthesized speech and/or data-augmented speech can be incorporated to increase the volume of training data used to train the ASR models.

SUMMARY

One aspect of the disclosure provides a computer-implemented method that when executed on data processing hardware causes the data processing hardware to perform operations for guided data selection for masked speech modeling. The operations include obtaining a sequence of encoded representations corresponding to an utterance. For each respective encoded representation in the sequence of encoded representations, the operations include processing, using a scorer model, the respective encoded representation to generate a corresponding probability distribution over possible speech recognition hypotheses for the respective encoded representation and assigning, to the respective encoded representation, a confidence score as a highest probability from the corresponding probability distribution over possible speech recognition hypotheses for the respective encoded representation. The operations also include selecting, from the sequence of encoded representations, a set of unmasked encoded representations to mask based on the confidence scores assigned to the sequence of encoded representations. The operations also include generating a set of masked encoded representations by masking the selected set of unmasked encoded representations. Each masked encoded representation in the set of masked encoded representations corresponds to a respective one of the unmasked encoded representations in the selected set of unmasked encoded representations.

Implementations of the disclosure may include one or more of the following optional features. In some implementations, selecting the set of unmasked encoded representations to mask includes selecting the top-K encoded representations from the sequence of encoded representations having the highest confidence scores. In these implementations, K may be based on a predetermined ratio of encoded representations in the sequence of encoded representations to be masked. Optionally, the predetermined ratio may be equal to forty percent.

In some examples, the operations further include, for each respective unmasked encoded representation in the selected set of unmasked encoded representations to mask, generating, a corresponding target context vector for the respective unmasked encoded representation using a quantizer. In these examples, the operations also include, for each respective masked encoded representation in the set of masked encoded representations: generating a corresponding contrastive context vector for the respective masked encoded representation; and generating a contrastive loss based on the corresponding contrastive context vector and the corresponding target context vector generated for the respective unmasked encoded representation that corresponds to the respective masked encoded representation, and pretraining an audio encoder using the contrastive losses generated for the set of masked encoded representations. In some implementations, the operations further include: for each respective unmasked encoded representation in the selected set of unmasked encoded representations to mask, generating a corresponding K-means cluster for the respective unmasked encoded representation using a cluster module; for each respective masked encoded representation in the set of masked encoded representations, generating a cross-entropy loss based on the corresponding contrastive context vector and the corresponding K-means cluster generated for the respective unmasked encoded representation that corresponds to the respective masked encoded representation; and pre-training the audio encoder using the cross-entropy losses generated for the set of masked encoded representations.

The operations may further include determining a final training objective based on the contrastive loss and the cross-entropy loss for each respective masked encoded representation in the set of masked encoded representations and pre-training the audio encoder using the final training objectives generated for the set of masked encoded representations. In some implementations, the operations further include determining an utterance-level confidence score by averaging the confidence scores in the set of masked encoded representations, weighting the final training objective based on the utterance-level confidence score, and pre-training the audio encoder using the weighted final training objective. Optionally, the operation further include extracting bottleneck features from the contrastive context vectors. Here, the operations further include refining each corresponding K-means cluster using the extracted bottleneck features.

Another aspect of the disclosure provides a system that includes data processing hardware and memory hardware storing instructions that when executed on the data processing hardware causes the data processing hardware to perform operations. The operations include obtaining a sequence of encoded representations corresponding to an utterance. For each respective encoded representation in the sequence of encoded representations, the operations include processing, using a scorer model, the respective encoded representation to generate a corresponding probability distribution over possible speech recognition hypotheses for the respective encoded representation and assigning, to the respective encoded representation, a confidence score as a highest probability from the corresponding probability distribution over possible speech recognition hypotheses for the respective encoded representation. The operations also include selecting, from the sequence of encoded representations, a set of unmasked encoded representations to mask based on the confidence scores assigned to the sequence of encoded representations. The operations also include generating a set of masked encoded representations by masking the selected set of unmasked encoded representations. Each masked encoded representation in the set of masked encoded representations corresponds to a respective one of the unmasked encoded representations in the selected set of unmasked encoded representations.

Implementations of the disclosure may include one or more of the following optional features. In some implementations, selecting the set of unmasked encoded representations to mask includes selecting the top-K encoded representations from the sequence of encoded representations having the highest confidence scores. In these implementations, K may be based on a predetermined ratio of encoded representations in the sequence of encoded representations to be masked. Optionally, the predetermined ratio may be equal to forty percent.

In some examples, the operations further include, for each respective unmasked encoded representation in the selected set of unmasked encoded representations to mask, generating, a corresponding target context vector for the respective unmasked encoded representation using a quantizer. In these examples, the operations also include, for each respective masked encoded representation in the set of masked encoded representations: generating a corresponding contrastive context vector for the respective masked encoded representation; and generating a contrastive loss based on the corresponding contrastive context vector and the corresponding target context vector generated for the respective unmasked encoded representation that corresponds to the respective masked encoded representation, and pretraining an audio encoder using the contrastive losses generated for the set of masked encoded representations. In some implementations, the operations further include: for each respective unmasked encoded representation in the selected set of unmasked encoded representations to mask, generating a corresponding K-means cluster for the respective unmasked encoded representation using a cluster module; for each respective masked encoded representation in the set of masked encoded representations, generating a cross-entropy loss based on the corresponding contrastive context vector and the corresponding K-means cluster generated for the respective unmasked encoded representation that corresponds to the respective masked encoded representation; and pre-training the audio encoder using the cross-entropy losses generated for the set of masked encoded representations.

The operations may further include determining a final training objective based on the contrastive loss and the cross-entropy loss for each respective masked encoded representation in the set of masked encoded representations and pre-training the audio encoder using the final training objectives generated for the set of masked encoded representations. In some implementations, the operations further include determining an utterance-level confidence score by averaging the confidence scores in the set of masked encoded representations, weighting the final training objective based on the utterance-level confidence score, and pre-training the audio encoder using the weighted final training objective. Optionally, the operation further include extracting bottleneck features from the contrastive context vectors. Here, the operations further include refining each corresponding K-means cluster using the extracted bottleneck features.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
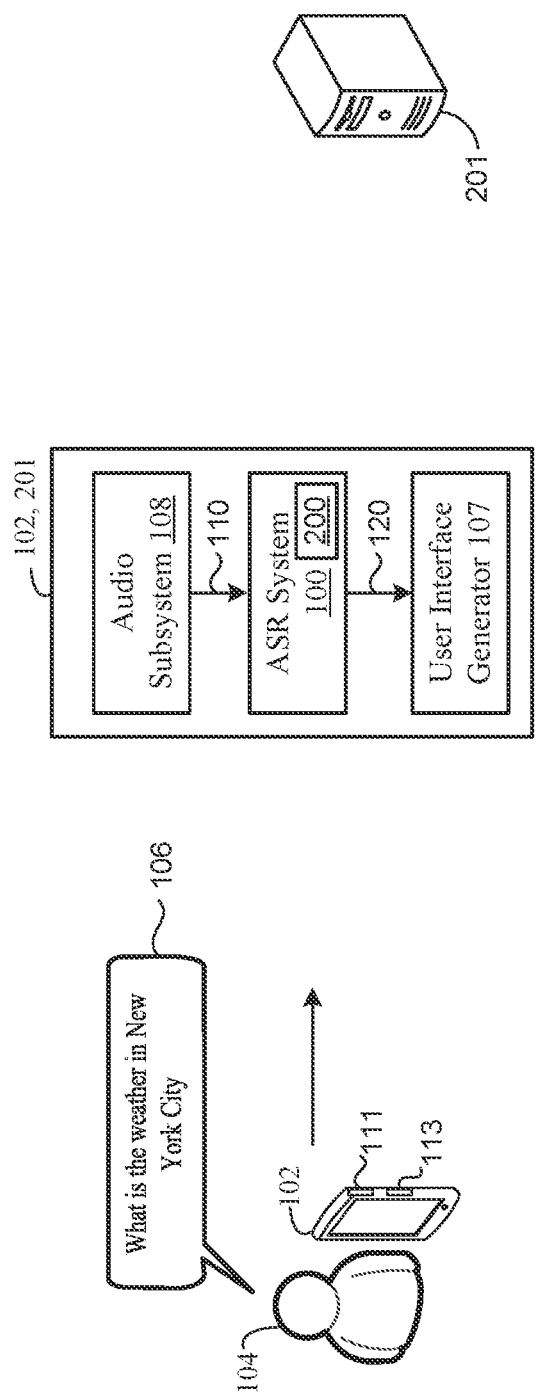
FIG. 1 is a schematic view of an example speech recognition system.

Automated speech recognition (ASR) has made tremendous strides with the introduction of sequence to sequence (Seq2Seq) models that map from audio to character sequences. At the same time, text-to-speech (TTS) or speech syntheses systems have successfully applied Seq2Seq models to obtain state of the art natural, realistic sounding synthesized speech that can be indistinguishable to the human ear from human speech.

One challenge in developing deep learning-based ASR models is that parameters of the ASR models tend to over fit the training data, thereby resulting in the ASR models having difficulties generalizing unseen data when the training data is not extensive enough. Thus, training ASR models on larger training datasets improves the accuracy of the ASR model. For instance, the use of machine learning or other statistical methods can train ASR models on training datasets that include upwards of 10,000 hours of transcribed speech. Yet, performance of ASR models suffers when a domain associated with the training data is distinct from a domain at which the ASR model will be deployed during inference. For example, training an ASR model on speech in a domain associated with video meetings would be less effective in recognizing speech related to voice search queries, and vice versa.

Pre-training ASR models with large amounts of unlabeled speech or text data and subsequently fine-tuning the pre-trained ASR model by training on a smaller set of labeled speech or text data has shown improvements in ASR model performance. In particular, masked speech modeling (MSM) is a pre-training technique that receives unlabeled sequences of input speech frames corresponding to training utterances and masks a portion of the input speech frames for each training utterance. Thereafter, the MSM pre-training method learns speech representations from the masked input speech frames. However, the input speech frames selected for masking are selected arbitrarily even though not all input speech frames include relevant information to learn meaningful representations. That is, selecting speech frames that include relevant information for masking may be more beneficial for the ASR model to learn meaningful representations during pre-training.

Accordingly, implementations herein are directed towards methods and systems for guided data selection for MSM. More specifically, a MSM pre-training process may execute a masking module that obtains a sequence of encoded representations corresponding to an utterance. The masking module processes each respective encoded representation to generate a corresponding probability distribution over possible speech recognition hypotheses and assigns a confidence score as a highest probability from the corresponding probability distribution. Based on the confidence scores assigned to the sequence of encoded representations, the masking module masks a selected set of encoded representations. Advantageously, the masking module selects encoded representations for masking that include relevant information thereby increasing the meaningful representations an ASR model learns during pre-training. Moreover, as will become apparent, the masking module may determine and an utterance-level confidence score for the entire utterance and weight a final training objective used to train the ASR model based on the utterance-level confidence score.

FIG. 1 illustrates an automated speech recognition (ASR) system 100 implementing an ASR model 200 that resides on a user device 102 of a user 104 and/or on a remote computing device 201 (e.g., one or more servers of a distributed system executing in a cloud-computing environment) in communication with the user device 102. Although the user device 102 is depicted as a mobile computing device (e.g., a smart phone), the user device 102 may correspond to any type of computing device such as, without limitation, a tablet device, a laptop/desktop computer, a wearable device, a digital assistant device, a smart speaker/display, a smart appliance, an automotive infotainment system, or an Internet-of-Things (IoT) device, and is equipped with data processing hardware 111 and memory hardware 113.

The user device 102 includes an audio subsystem 108 configured to receive an utterance 106 spoken by the user 104 (e.g., the user device 102 may include one or more microphones for recording the spoken utterance 106) and convert the utterance 106 into a corresponding digital format associated with input acoustic frames 110 capable of being processed by the ASR system 100. In the example shown, the user speaks a respective utterance 106 in a natural language of English for the phrase "What is the weather in New York City?" and the audio subsystem 108 converts the utterance 106 into corresponding acoustic frames 110 for input to the ASR system 100. Thereafter, the ASR model 200 receives, as input, the acoustic frames (i.e., sequence of input speech frames) 110 corresponding to the utterance 106, and generates/predicts, as output, a corresponding transcription 120 (e.g., recognition result/hypothesis) of the utterance 106. In the example shown, the user device 102 and/or the remote computing device 201 also executes a user interface generator 107 configured to present a representation of the transcription 120 of the utterance 106 to the user 104 of the user device 102. In some configurations, the transcription 120 output from the ASR system 100 is processed, e.g., by a natural language understanding (NLU) module executing on the user device 102 or the remote computing device 201, to execute a user command. Additionally or alternatively, a text-to-speech system (e.g., executing on any combination of the user device 102 or the remote computing device 201) may convert the transcription into synthesized speech for audible output by another device. For instance, the original utterance 106 may correspond to a message the user 104 is sending to a friend in which the transcription 120 is converted to synthesized speech for audible output to the friend to listen to the message conveyed in the original utterance 106.

Figure 2:
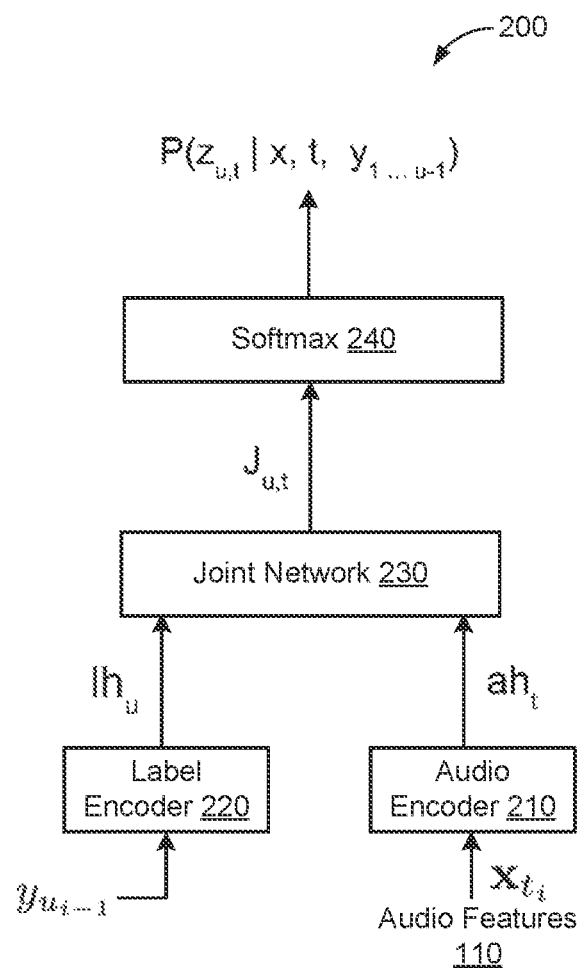
FIG. 2 is a schematic view of an example speech recognition model.

Referring to FIG. 2, an example ASR model 200 includes a Recurrent Neural Network-Transducer (RNN-T) model architecture which adheres to latency constrains associated with interactive applications. The use of the RNN-T model architecture is exemplary, and the ASR model 200 may include other architectures such as transformer-transducer and conformer-transducer model architectures among others. The RNN-T model architecture of the ASR model (i.e., RNN-T model) 200 provides a small computational footprint and utilizes less memory requirements than conventional ASR architectures, making the RNN-T model architecture suitable for performing speech recognition entirely on the user device 102 (e.g., no communication with a remote server is required). The RNN-T model 200 includes an encoder network 210, a prediction network 220, and a joint network 230. The encoder network 210, which is roughly analogous to an acoustic model (AM) in a traditional ASR system, includes a stack of self-attention layers (e.g., Conformer or Transformer layers) or a recurrent network of stacked Long Short-Term Memory (LSTM) layers. For instance, the encoder reads a sequence of d-dimensional feature vectors (e.g., acoustic frames 110 (FIG. 1)) $x=(x_1, x_2, \ldots, x_T)$, where $x_t \in \mathbb{R}_d$, and produces at each output step a higher-order feature representation. This higher-order feature representation is denoted as $h_1^{enc}, \ldots, h_T^{enc}$.

Similarly, the prediction network 220 is also an LSTM network, which, like a language model (LM), processes the sequence of non-blank symbols output by a final Softmax layer 240 so far, $y_0, \ldots, y_{ui-1}$, into a dense representation $p_{u_i}$. Finally, with the RNN-T model architecture, the representations produced by the encoder and prediction/decoder networks 210, 220 are combined by the joint network 230. The prediction network (i.e., label encoder) 220 may be replaced by an embedding look-up table to improve latency by outputting looked-up sparse embeddings in lieu of processing dense representations. The joint network then predicts $P(y_i|x_{t_i}, y_0, \ldots, y_{u_{i-1}})$, which is a distribution over the next output symbol. Stated differently, the joint network 230 generates, at each output step (e.g., time step), a probability distribution over possible speech recognition hypotheses. Here, the "possible speech recognition hypotheses" correspond to a set of output labels each representing a symbol/character in a specified natural language. For example, when the natural language is English, the set of output labels may include twenty-seven (27) symbols, e.g., one label for each of the 26-letters in the English alphabet and one label designating a space. Accordingly, the joint network 230 may output a set of values indicative of the likelihood of occurrence of each of a predetermined set of output labels. This set of values can be a vector and can indicate a probability distribution over the set of output labels. In some cases, the output labels are graphemes (e.g., individual characters, and potentially punctuation and other symbols), but the set of output labels is not so limited. For example, the set of output labels can include wordpieces and/or entire words, in addition to or instead of graphemes. The output distribution of the joint network 230 can include a posterior probability value for each of the different output labels. Thus, if there are 100 different output labels representing different graphemes or other symbols, the output $y_i$ of the joint network 230 can include 100 different probability values, one for each output label. The probability distribution can then be used to select and assign scores to candidate orthographic elements (e.g., graphemes, wordpieces, and/or words) in a beam search process (e.g., by the Softmax layer 240) for determining the transcription 120.

The Softmax layer 240 may employ any technique to select the output label/symbol with the highest probability in the distribution as the next output symbol predicted by the RNN-T model 200 at the corresponding output step. In this manner, the RNN-T model 200 does not make a conditional independence assumption, rather the prediction of each symbol is conditioned not only on the acoustics but also on the sequence of labels output so far. The RNN-T model 200 does assume an output symbol is independent of future acoustic frames 110, which allows the RNN-T model 200 to be employed in a streaming fashion.

In some examples, the encoder network (i.e., audio encoder) 210 of the RNN-T model 200 includes a stack of self-attention layers/blocks, such as conformer blocks. Here, each conformer block includes a series of multi-headed self attention, depth wise convolution and feed-forward layers. The prediction network 220 may have two 2,048-dimensional LSTM layers, each of which is also followed by 640-dimensional projection layer. Alternatively, the prediction network 220 may include a stack of transformer or conformer blocks, or an embedding look-up table in lieu of LSTM layers. Finally, the joint network 230 may also have 640 hidden units. The softmax layer 240 may be composed of a unified word piece or grapheme set that is generated using all unique word pieces or graphemes in a plurality of training data sets.

Figure 3A:
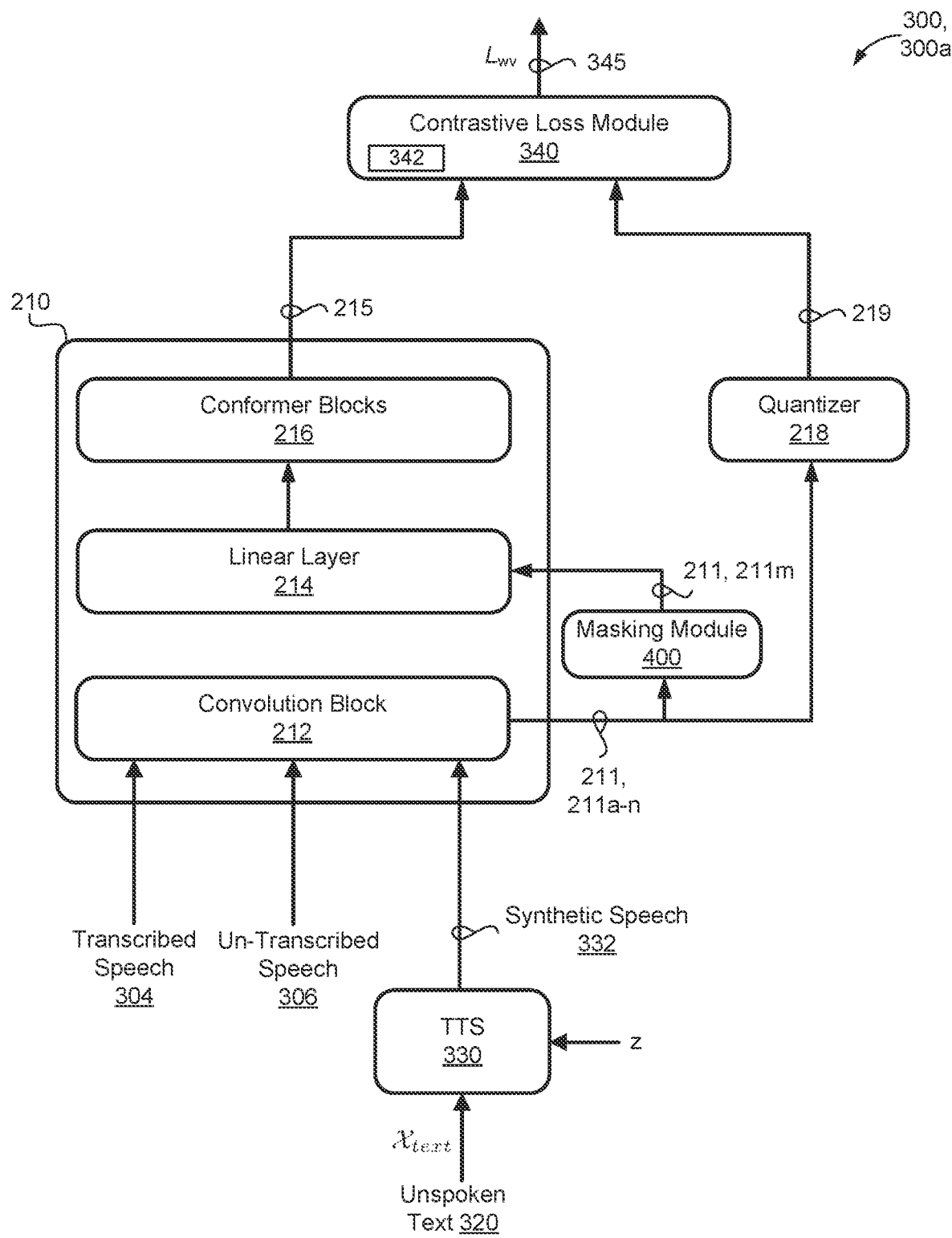
FIGS. 3A-3C are schematic views of an example ask-to-mask training process.
Figure 3B:
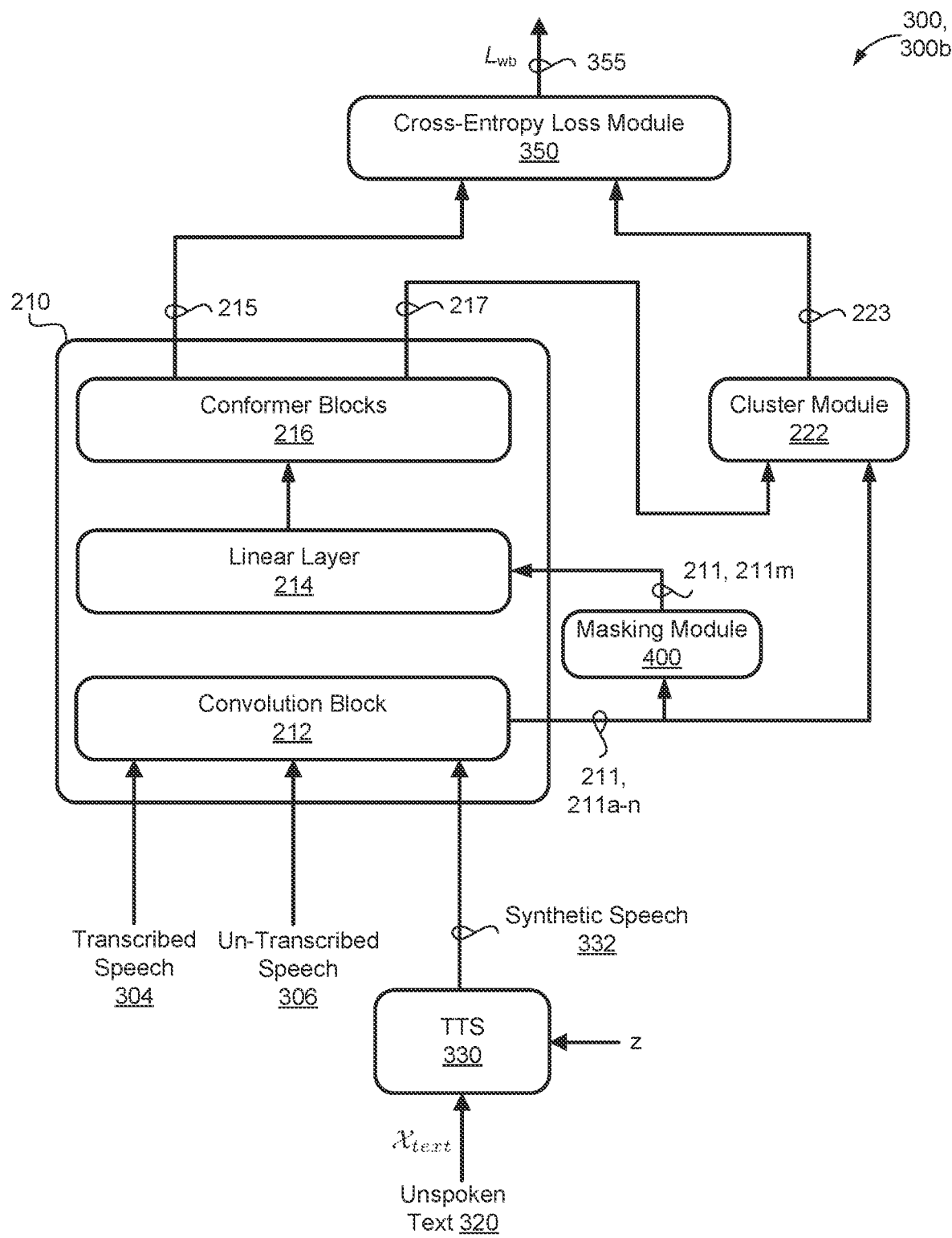
Figure 3C:
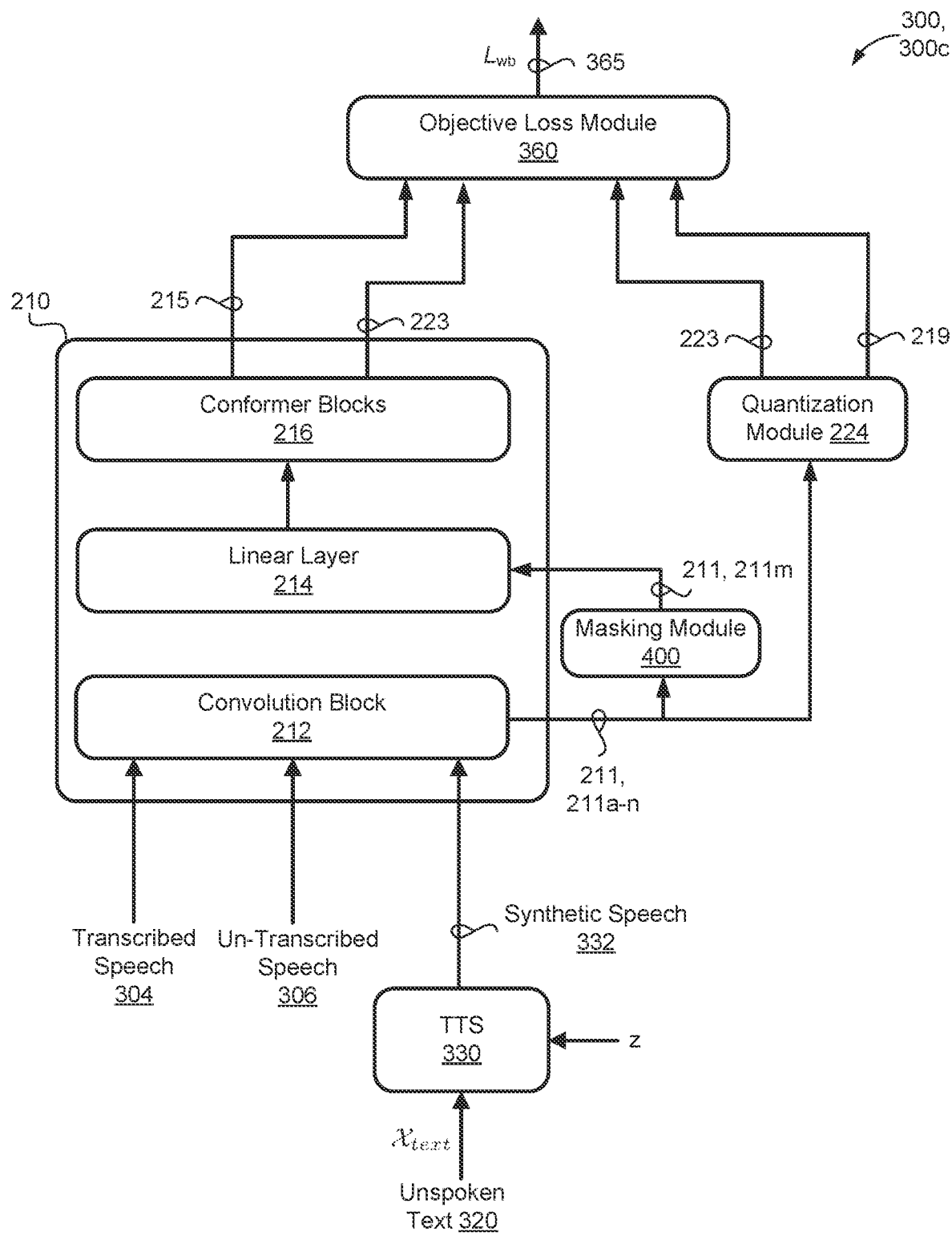

FIGS. 3A-3C illustrate an example ask-to-mask (ATM) training process 300 using different MSM architectures for pre-training the ASR model 200 (FIG. 2). The ATM training process 300 (also referred to as simply "training process 300") may pre-train the ASR model 200 using available training data that includes a set of unspoken textual utterances 320, a set of transcribed non-synthetic speech utterances 304, and/or un-transcribed non-synthetic speech utterances 306. Each unspoken textual utterance 320 includes text-only data (i.e., unpaired data) such that each unspoken textual utterance 320 is not paired with any corresponding spoken audio representations (i.e., speech) of the utterance. The unspoken textual utterance 320 may include any sequence of text chunks including words, word-pieces, phonemes and/or graphemes. Each un-transcribed non-synthetic speech utterance 306 (also refereed to as simply "un-transcribed speech utterance 306") includes audio-only data (i.e., unpaired data) such that the un-transcribed speech utterance is not paired with any corresponding transcription. On the other hand, each transcribed non-synthetic speech utterance 304 (also referred to as simply "transcribed speech utterance 304") includes a corresponding transcription (not shown) paired with a corresponding non-synthetic speech representation of the corresponding transcribed speech utterance.

The training data may also include synthesized speech representations (e.g., synthetic speech) 332 for each of a plurality of unspoken training text utterances 320. That is, the unspoken training text utterances 320 include unspoken text that is text-only data, i.e., unpaired data, such that each unspoken training text utterance is not paired with any synthesized or non-synthesized speech. Accordingly, a text-to-speech (TTS) system 330 may generate a corresponding synthesized speech representation 332 for each of the unspoken training text utterances 320. Notably, the synthesized speech representations may include mel-frequency spectrogram frames for training the ASR model 200 thereby eliminating the need for the training process 300 to include a vocoder and/or synthesizer to synthesize the mel-frequency spectrogram frames into synthesized speech.

The TTS system 330 may apply a speaker embedding z when converting the unspoken textual utterances 320 to generate synthesized speech representations 332 with a specific speaking style and prosody associated with the speaker embedding. The TTS system 330 may apply a multitude of different speaker embeddings z each associated with different speaker characteristics of the resulting synthesized speech representations 332. Similarly, the TTS system 330 may vary the prosodic and other production qualities of the utterances being synthesized. In some examples, the training process 300 applies data augmentation to at least one of the sample utterances of synthesized speech representations 332. The data augmentations may include, without limitation, adding noise, manipulating timing (e.g., stretching), or adding reverberation to the corresponding synthesized speech representation. Data augmentation may add different synthesized recording conditions to the synthesized speech representations 332.

For simplicity, the training process 300 includes a contrastive self-supervised loss part 300a (FIG. 3A), a cross-entropy self-supervised loss part 300b (FIG. 3B), and a final training objective self-supervised loss part 300c (FIG. 3C). The training process 300 may pre-train the audio encoder 210 using any combination of the losses derived from the contrastive self-supervised loss part 300a (FIG. 3A), the cross-entropy self-supervised loss part 300b (FIG. 3B), and the final training objective self-supervised loss part 300c (FIG. 3C).

Continuing with reference to FIGS. 3A-3C, in the example shown, the audio encoder 210 of the ASR model 200 (FIG. 2) includes a stack of self-attention layers that each include a multi-headed (e.g., 8 heads) self-attention mechanism. For instance, the stack of self-attention layers may include a stack of Conformer layers or Transformer layers. In the examples shown, the audio encoder 210 includes a Conformer encoder including a stack of conformer blocks each of which includes a series of multi-headed self attention, depth wise convolution, and feed-forward layers. The Conformer encoder 210 may be split into a feature encoder, including a convolution subsampling block 212, and a context network, including a linear layer 214 and a stack of Conformer blocks 216. In some implementations, the convolution subsampling block 212 has two two-dimensional convolution layers, both with strides (2, 2), resulting in a 4× reduction in the feature sequence length.

The convolution subsampling block 212 receives, as input, a sequence of input speech frames (e.g., mel-frequency spectrograms such as the acoustic frames 110 of FIG. 1) associated with each transcribed speech utterance 304, each un-transcribed non-synthetic speech utterance 306, and each synthesized speech representation 332 and generates, as output a sequence of encoded representation 211, 211a-n that corresponds to a respective one of: one of the transcribed speech utterances 304, un-transcribed speech utterances 306, or one of the synthesized speech representations 332. Each encoded representation 211 in the sequence of encoded representations 211 may represent a grapheme, phoneme, word-piece, or word. Moreover, each sequence of encoded representations 211 corresponds to a respective one of the utterances in the training data. The sequence of encoded representations 211 (E=[e₁, e₂, ..., e_T]) output from the convolution subsampling block 212 may be fed to a masking module 400 that masks a selected set of the encoded unmasked representations 211.

Figure 4:
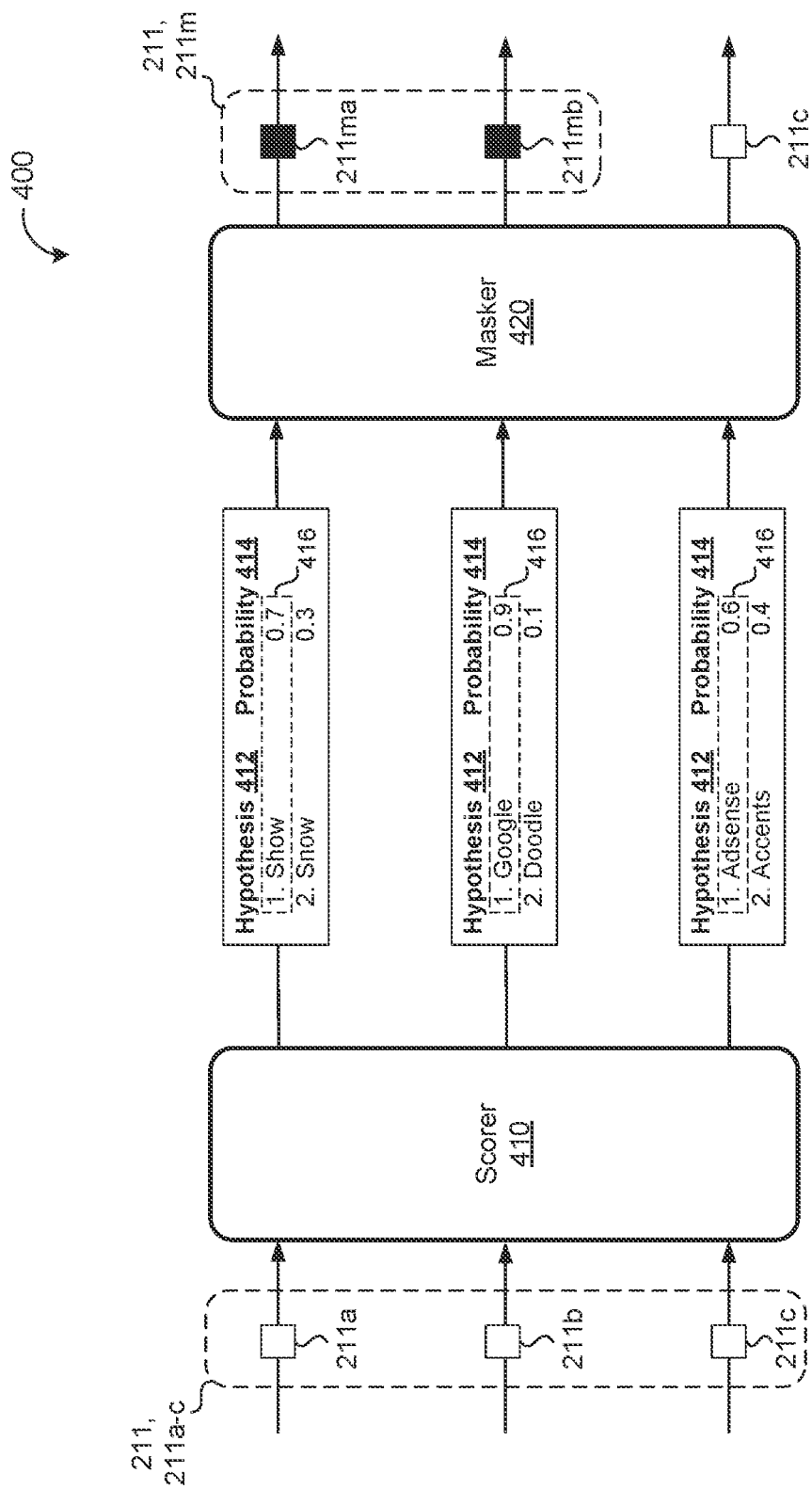
FIG. 4 is a schematic view of an example masking module.

Referring now to FIG. 4, in some implementations, the masking module 400 includes a scorer model 410 and a masker 420. The scorer model 410 (also referred to simply as "scorer 410") obtains the sequence of encoded representations 211 and processes each respective encoded representation 211 to generate a corresponding probability distribution 414 over possible speech recognition hypotheses 412 for the respective encoded representation 211. The sequence of encoded representations 211 received by the scorer 410 are unmasked. Moreover, the scorer 410 generates the probability distributions at a frame-level (e.g., for each encoded representation 211). The probability distribution 414 includes a probability associated with each possible speech recognition hypothesis (i.e., label). In some instances, the scorer 410 may determine the probability distribution 414 by:

$$P = p(e_t = l|E); l \in L \qquad (1)$$

In Equation 1, P represents the probability distribution 414 for a respective encode representation 211 and l represents a respective one of a potential speech recognition hypothesis (i.e., label) from a plurality of potential speech recognition hypotheses L (i.e., labels) in a codebook. For example, as shown in FIG. 4, the scorer 410 receives three (3) encoded representations 211a-c each representing a word corresponding to an utterance "Show Google Adsense." In this example, the scorer 410 processes a first encoded representation 211a representing the word "show" to generate a corresponding first probability distribution 414 over possible speech recognition hypotheses 412 for the first encoded representation 211a, processes a second encoded representation 211b representing the word "Google" to generate a corresponding second probability distribution 414 over possible speech recognition hypotheses 412 for the second encoded representation 211b, and processes a third encoded representation 211c representing the word "Adsense" to generate a corresponding third probability distribution 414 over possible speech recognition hypotheses 412 for the third encoded representation 211c. Here, the first probability distribution 414 includes probabilities 0.7 and 0.3 for possible speech recognition hypotheses 412 "show" and "snow" respectively, the second probability distribution 414 includes probabilities 0.9 and 0.1 for possible speech recognition hypotheses 412 "Google" and "Doodle" respectively, and the third probability distribution 414 includes probabilities 0.6 and 0.4 for possible speech recognition hypotheses 412 "Adsense" and "Accents" respectively.

In some implementations, the scorer 410 is an external ASR model trained on training data similar to the target domain (i.e., in-domain data). The scorer 410 may be a frame-synchronous ASR model employing a connectionist temporal classification (CTC) objective such that the ASR model generates frame-level (e.g., for each encoded representations 211) probability distributions. The scorer 410 may generate the probability distribution 414 based on a likelihood that each speech recognition hypothesis 412 for the respective encoded representation 211 is an accurate transcription of the corresponding utterance. In other implementations, the scorer 410 generates the probability distribution 414 based on a similarity of each speech recognition hypothesis 412 and a target domain. For example, the target domain for the ASR model 200 may be associated with video meetings whereby the scorer 410 generates higher probabilities for speech recognition hypotheses 412 that likely belong to the target domain (e.g., video meetings). Optionally, the scorer 410 may use some combination of transcription accuracy and similarity with the target domain to generate the probability distribution 414. Accordingly, speech recognition hypothesis 412 having a high probability indicates that the speech recognition hypothesis 412 likely includes meaningful information for the ASR model 200 (FIG. 2) to learn meaningful representations during pre-training.

Moreover, the scorer 410 assigns a confidence score 416 as a highest probability from the corresponding probability distribution 414 over speech recognition hypotheses 412 for the respective encoded representation 211. The scorer 410 may assign the confidence score 416 as the highest probability from the corresponding probability distribution 414 over speech recognition hypotheses 412 by:

$$s_t = \max_l p(e_t = l|E) \qquad (2)$$

In Equation 2, $s_t$ represents confidence score 416 for a respective encoded representation 211. The scorer 410 samples K masking start indices $\{i_1, \ldots, i_k\}$ with probabilities by:

$$p(i_k = t) = \frac{s_t}{\sum_{k \notin \{i_1, \ldots, i_{k-1}\}} s_t} \cdot \delta_{t \notin \{i_1, \ldots, i_{k-1}\}} \qquad (3)$$

Notably, in Equation 3, $\delta_{t \notin \{i_1, \ldots, i_{k-1}\}}$ ensures that the scorer 410 samples without replacement. Thus, the scorer 410 samples initial encoded representations 211 in the sequence of encoded representations 211 with a probability proportional to the probability for each possible speech recognition hypothesis 412. Continuing with the above example, the scorer 410 assigns 0.7 as the confidence score 416 for the first encoded representation 211a, 0.9 as the confidence score 416 for the second encoded representation 211b, and 0.6 as the confidence score 416 for the third encoded representation 211c because these probabilities are the highest probabilities in their respective probability distributions 414. As shown in FIG. 4, the confidence score 416 assigned to each encoded representation 211 is denoted by the dashed box.

In some examples, scorer 410 assigns the confidence score 416 as low probability from the corresponding probability distribution 414 over speech recognition hypotheses 412 for the respective encoded representation 211. The scorer 410 may also assign the confidence score as a mix of high and low probabilities. In particular, the scorer 410 may assign the confidence score 416 to low probabilities by:

$$s_t = 1 - \max_l p(v_t = l|E) \qquad (4)$$

The masker 420 receives the confidence scores 416 assigned to each encoded representation 211 in the sequence of encoded representations 211 and selects a set of unmasked encoded representations 211 to mask. That is, the masker 420 may select the top-K encoded representations 211 from the sequence of unmasked encoded representations 211 that the ASR model 200 learns meaningful representations from during pre-training. Here, K represents a number of encoded representations 211 that the masker 420 selects. In some instances, K is based on a predetermined ratio of encoded representations 211 in the sequence of encoded representations 211 to be masked. For example, K may represent a predetermined ratio of forty (40) percent, however, it is understood that the predetermined ratio may be any ratio. Thus, in this example, the masker 420 may set K to four (4) for an utterance that includes ten (10) encoded representations 211 in the sequence of encoded representations 211.

The masker 420 generates a set of masked encoded representations 211, 211m by masking the selected set of unmasked encoded representations 211. Continuing with the example shown in FIG. 4, the predetermined ratio may be thirty-three (33) percent whereby the masker 420 selects the two (2) encoded representations 211 of the total three (3) encoded representations 211 having the highest confidence scores 416. Here, the masker 420 selects the first encoded representation 211a and the second encoded representation 211b as the set of unmasked encoded representations 211 for masking because these encoded representations 211 have the highest assigned confidence scores 416. Thereafter, the masker 420 generates the set of masked encoded representations 211ma, 211mb by masking the first encoded representation 211a and the second encoded representation 211b denoted by the black boxes. Thus, each masked encoded representation 211m in the set of masked encoded representations 211m corresponds to a respective one of the unmasked encoded representations 211 in the selected set of unmasked encoded representations 211. As shown in FIG. 4, the first encoded representation 211a corresponds to a first masked encoded representation 211ma and the second encoded representation 211b corresponds to a second masked encoded representation 211mb. As will become apparent, the training process 300 (FIG. 3) only pre-trains the ASR model 200 (FIG. 2) using the set of masked encoded representations 211m.

Referring now to FIG. 3A, the contrastive self-supervised loss part 300a the training process 300 generates a contrastive loss term 342 and a contrastive training objective 345. In particular, the linear layer 214 and the Conformer blocks 216 of the context network receive the set of masked encoded representations 211m and outputs a corresponding contrastive context vectors 215 ($c_j \in C$) for each corresponding masked encoded representation 211m in the set of masked encoded representations 211m. That is, the audio encoder 210 generates contrastive context vectors 215 for all masked time instances $j \in J$. Moreover, a quantizer 218 receives the selected set of unmasked encoded features 211, as input, and generates a corresponding quantized vector 219 ($Q=[q_1, q_2, \ldots, q_T]$) for each respective unmasked encoded feature 211 as output. Each target context vector (i.e., target context vector) 219 includes L dimensions that denotes a number of targets or codes in a codebook. The quantizer 218 may be a Gumbel-softmax quantizer.

Thereafter, a contrastive loss module 340 derives a contrastive loss term 342 ($\mathcal{L}_{ctr}$) based on the corresponding contrastive context vector 215 and the corresponding target context vector 219 generated for the respective unmasked encoded representation 211 that corresponds to the respective masked encoded representations 211m. In some examples, the training process 300 pre-trains the audio encoder 210 by directly using the contrastive loss term 342. In other examples, the contrastive loss module 340 determines a determines a diversity loss ($\mathcal{L}_{div}$) to derive a contrastive training objective 345 ($\mathcal{L}_{wv}$) used to pre-train the audio encoder 210. In these examples, the contrastive loss module 340 derives the contrastive training objective 345 by:

$$\mathcal{L}_{wv} = \mathcal{L}_{ctr} + 0.1 \cdot \mathcal{L}_{div} \tag{5}$$

In Equation 5, $\mathcal{L}_{ctr} = \Sigma_{j=1}^{J} \mathcal{L}_{ctr}(c_j, q_j)$ and $\mathcal{L}_{div}$ represents the diversity loss. The contrastive loss term 342 depends on the codebook to represent both positive and negative examples and the diversity loss encourages increased use of the quantized codebook representations. In particular, the diversity loss encourages equal use of V entries in each of the G codebooks by maximizing the entropy of the averaged softmax distribution over the codebook entries for each codebook. The contrastive loss module 340 may derive the diversity loss ($\mathcal{L}_{div}$) by:

$$\mathcal{L}_d = \frac{1}{GV} \sum_{g=1}^{G} -H(\bar{p}_g) = \frac{1}{GV} \sum_{g=1}^{G} \sum_{v=1}^{V} \bar{p}_{g,v} \log \bar{p}_{g,v} \tag{6}$$

The training process 300 may train the ASR model 200 (FIG. 2) by updating parameters of the audio encoder 210 based on the contrastive training objective 345 and/or the contrastive loss term 342.

Referring now to FIG. 3B, the cross-entropy loss part 300b of the training process 300 generates a cross-entropy loss 355 for pre-training the ASR model 200 (FIG. 2). In particular, the linear layer 214 and the Conformer blocks 216 of the context network receive the set of masked encoded representations 211m and outputs a corresponding contrastive context vectors 215 ($c_j \in C$) for each corresponding masked encoded representation 211m in the set of masked encoded representations 211m. That is, the audio encoder 210 generates contrastive context vectors 215 for all masked time instances $j \in J$. Moreover, a cluster module 222 receives the selected set of unmasked encoded features 211, as input, and generates a corresponding K-means cluster 223 ($Y=[y_1, y_2, \ldots, y_T]$) for each respective unmasked encoded feature 211 as output. Optionally, the cluster module 222 may receive bottleneck features 217 extracted from the contrastive context vectors 215 and further refine each K-means cluster 223 using the extracted bottleneck features 217. Notably, each K-means clusters 223 represent a target for a respective one of the contrastive context vectors 215.

Thereafter, a cross-entropy loss module 350 derives the cross-entropy loss 355 ($\mathcal{L}_{ce}$) based on the corresponding contrastive context vector 215 and the corresponding K-means cluster 223 generated for the respective unmasked encoded representation 211 that corresponds to the respective masked encoded representations 211m. The training process 300 pre-trains the audio encoder 210 by updating parameters of the audio encoder 210 based on the cross-entropy loss 355.

Referring now to FIG. 3C, the final training objective self-supervised loss part 300c of the training process 300 generates a final training objective 375 for pre-training the ASR model 200 (FIG. 2). In particular, the linear layer 214 and the Conformer blocks 216 of the context network receive the set of masked encoded representations 211m and outputs a corresponding contrastive context vectors 215 ($c_j \in C$) for each corresponding masked encoded representation 211m in the set of masked encoded representations 211m. That is, the audio encoder 210 generates contrastive context vectors 215 for all masked time instances j∈J. Moreover, the audio encoder 210 may generate refined contrastive context vectors 213 by refining the contrastive context vectors 215 further. The audio encoder 210 generates the refined contrastive context vectors 213 by:

$$y_j = \frac{\arg\max q_{j,l}, l \in L}{l} \quad (7)$$

In Equation 7, $y_j$ represents the refined contrastive context vector 213. Here, the contrastive context vectors 215 are targets for the target context vectors 219 and the refined contrastive context vectors are targets for the K-means clusters 223. A quantization module 224 may receive the selected set of unmasked encoded features 211 as input. In some instances, the quantization module 224 includes the quantizer 218 (FIG. 3A) and the cluster module 222 (FIG. 3B). Accordingly, the quantization module 224 generates a corresponding quantized vector 219 (Q=[$q_1, q_2, \ldots, q_T$]) for each respective unmasked encoded feature 211 as output using the quantizer 218 (FIG. 3A) and generates a corresponding K-means cluster 223 (Y=[$y_1, y_2, \ldots, y_T$]) for each respective unmasked encoded feature 211 as output using the cluster module 222 (FIG. 3B).

In some examples, an objective loss module 360 derives a final training objective 365 ($\mathcal{L}_{wb}$) based on the contrastive training objective 345 and the cross-entropy loss 355. In particular, the objective loss module 360 derives the contrastive loss term 342 and the contrastive loss objective 345 based on the corresponding contrastive context vector 215 and the corresponding target context vector 219 generated for the respective unmasked encoded representation 211 that corresponds to the respective masked encoded representations 211m. Moreover, the objective loss module 360 derives the cross-entropy loss 355 ($\mathcal{L}_{ce}$) based on the corresponding refined contrastive context vector 213 and the corresponding K-means cluster 223 generated for the respective unmasked encoded representation 211 that corresponds to the respective masked encoded representations 211m. For each respective masked encoded representation 211m, the objective loss module 360 determines the final training objective based on the contrastive loss term 342 (or contrastive loss objective 345) and the cross-entropy loss 355 by:

$$\mathcal{L}_{wb} = \mathcal{L}_{ce} + \mathcal{L}_{wv} \quad (8)$$

In Equation 8, $\mathcal{L}_{wb}$ represents the final training objective 365. The training process 300 may train the audio encoder 210 by updating parameters of the audio encoder 210 based on the final training objective 365.

As described above, the training process 300 determines losses for each encoded representation 211 (e.g., frame-level) in the sequence of encoded representations 211 that correspond to an utterance. In some instances, the training process 300 may benefit from selecting training samples at a coarser utterance-level rather than the frame-level. As such, the training process 300 may determine an utterance-level confidence score by averaging the confidence scores 416 of all the masked encoded representations 211m in the set of masked encoded representations 211 by:

$$s_u = \frac{1}{T}\sum_{t=1}^{T} s_{t,u} \quad (9)$$

In Equation 9, su represents the utterance-level confidence score. Moreover, the training process 300 may weight the final training objective 365 based on the utterance-level confidence score. For example, the training process 300 assigns a high weight to the final training objective 365 associated with a high utterance-level confidence score. As such, weighted final training objective 365 with the high weight would have a greater impact on pre-training the audio encoder 210 than a weighted final training objective 365 with a lower weight.

Figure 5:
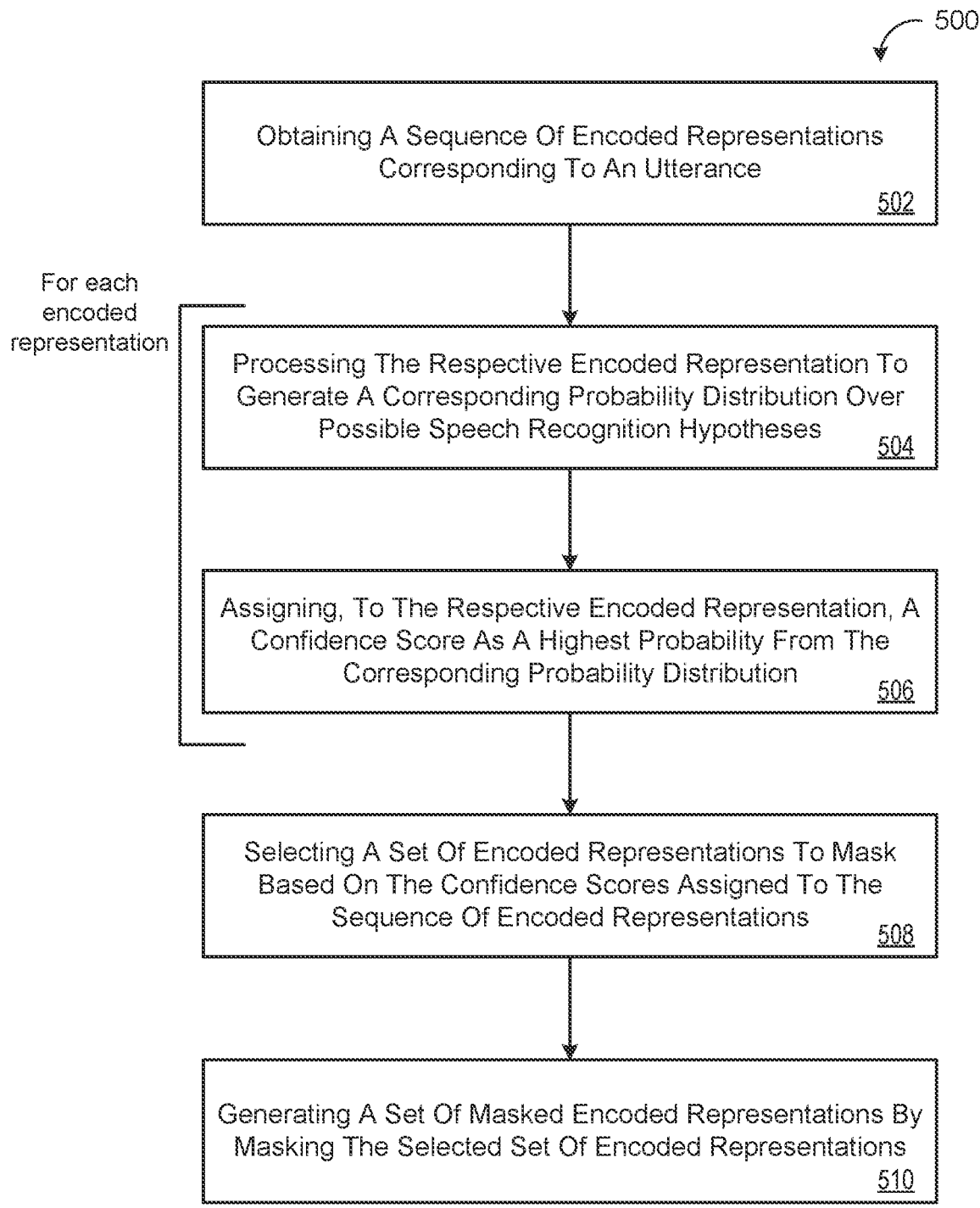
FIG. 5 is a flowchart of an example arrangement of operations for a computer-implemented method of guided data selection for masked speech modeling.
Figure 6:
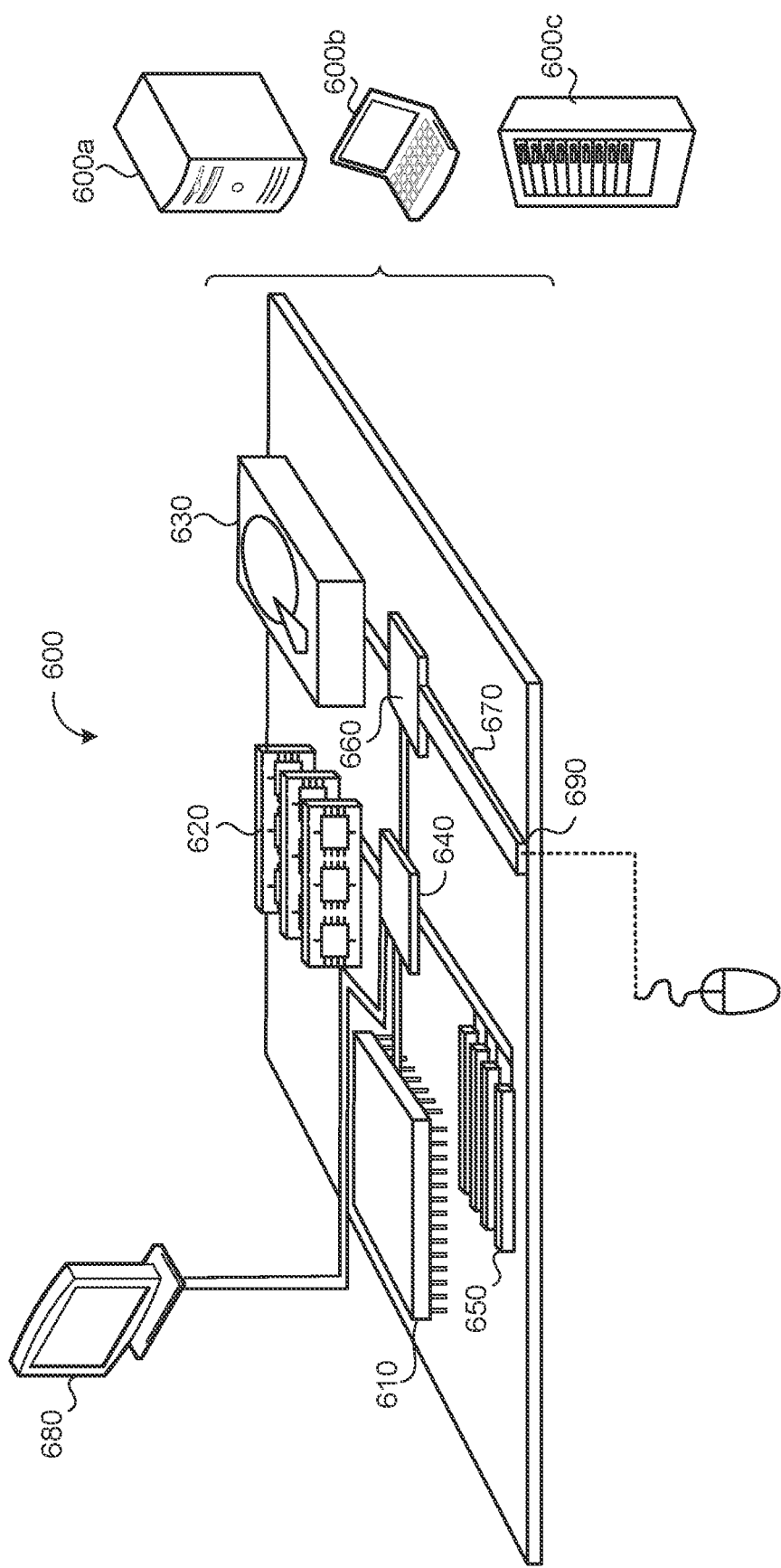
FIG. 6 is a schematic view of an example computing device that may be used to implement the systems and methods described herein.

FIG. 5 is a flowchart of an example arrangement of operations for a method 500 of guided data selection for masked speech modeling. The method 500 may execute on data processing hardware 610 (FIG. 6) using instructions stored on memory hardware 620 (FIG. 6). The data processing hardware 610 and the memory hardware 620 may reside on the user device 102 and/or the remote computing device 201 of FIG. 1 corresponding to a computing device 600 (FIG. 6).

At operation 502, the method 500 includes obtaining a sequence of encoded representations 211, 211a-n corresponding to an utterance 106. For each respective encoded representation 211 in the sequence of encoded representations 211, the method 500 performs operations 504 and 506. At operation 504, the method 500 includes processing, using a scorer model 410, the respective encoded representation 211 to generate a corresponding probability distribution 414 over possible speech recognition hypotheses 412 for the respective encoded representation 211. At operation 506, the method 500 includes assigning, to the respective encoded representation 211, a confidence score 416 as a highest probability from the corresponding probability distribution 414 over speech recognition hypotheses 412 for the respective encoded representation 211. At operation 508, the method 500 includes selecting a set of unmasked encoded representations 211 to mask from the sequence of encoded representations 211 based on the confidence scores 416 assigned to the sequence of encoded representations 211. At operation 510, the method 500 includes generating a set of masked encoded representations 211, 211m by masking the selected set of unmasked encoded representations 211. Here, each masked encoded representation 211m in the set of masked encoded representations 211m corresponds to a respective one of the unmasked encoded representations 211 in the selected set of unmasked encoded representations 211.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide for interaction with a user as well, for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method for guided data selection for masked speech modeling, the computer-implemented method when executed on data processing hardware causes the data processing hardware to perform operations comprising:
    obtaining a sequence of encoded representations corresponding to an utterance;
    for each respective encoded representation in the sequence of encoded representations:
    processing, using a scorer model, the respective encoded representation to generate a corresponding probability distribution over possible speech recognition hypotheses for the respective encoded representation; and
    assigning, to the respective encoded representation, a confidence score as a highest probability from the corresponding probability distribution over possible speech recognition hypotheses for the respective encoded representation;
    based on the confidence scores assigned to the sequence of encoded representations, selecting, from the sequence of encoded representations, a set of unmasked encoded representations to mask;
    generating a set of masked encoded representations by masking the selected set of unmasked encoded representations, wherein each masked encoded representation in the set of masked encoded representations corresponds to a respective one of the unmasked encoded representations in the selected set of unmasked encoded representations;
    pre-training an audio encoder based on the set of masked encoded representations,
    wherein a speech recognition model comprising the pre-trained audio encoder is configured to generate a speech recognition result for a spoken utterance; and
    determining an utterance-level confidence score by averaging the confidence scores assigned to the set of masked encoded representations.

2. The computer-implemented method of claim 1, wherein the operations further comprise:
    for each respective unmasked encoded representation in the selected set of unmasked encoded representations to mask, generating, using a quantizer, a corresponding target context vector for the respective unmasked encoded representation; and
    for each respective masked encoded representation in the set of masked encoded representations:
        generating a corresponding contrastive context vector for the respective masked encoded representation; and
        generating a contrastive loss based on the corresponding contrastive context vector and the corresponding target context vector generated for the respective unmasked encoded representation that corresponds to the respective masked encoded representation,
    wherein pre-training the audio encoder is further based on using the contrastive losses generated for the set of masked encoded representations.

3. The computer-implemented method of claim 2, wherein the operations further comprise:
    for each respective unmasked encoded representation in the selected set of unmasked encoded representations to mask, generating, using a cluster module, a corresponding K-means cluster for the respective unmasked encoded representation; and
    for each respective masked encoded representation in the set of masked encoded representations, generating a cross-entropy loss based on the corresponding contrastive context vector and the corresponding K-means cluster generated for the respective unmasked encoded representation that corresponds to the respective masked encoded representation, and
    wherein pre-training the audio encoder is further based on using the cross-entropy losses generated for the set of masked encoded representations.

4. The computer-implemented method of claim 3, wherein the operations further comprise:
    for each respective masked encoded representation in the set of masked encoded representations, determining a final training objective based on the contrastive loss and the cross-entropy loss,
    wherein pre-training the audio encoder is further based on the final training objectives generated for the set of masked encoded representations.

5. The computer-implemented method of claim 4, wherein the operations further comprise:
    determining an utterance-level confidence score by averaging the confidence scores in the set of masked encoded representations; and
    weighting the final training objective based on the utterance-level confidence score,
    wherein pre-training the audio encoder is further based on the weighted final training objective.

6. The computer-implemented method of claim 3, wherein the operations further comprise extracting bottleneck features from the contrastive context vectors.

7. The computer-implemented method of claim 6, wherein the operations further comprise refining each corresponding K-means cluster using the extracted bottleneck features.

8. The computer-implemented method of claim 1, wherein selecting the set of unmasked encoded representations to mask comprises selecting the top-K encoded representations from the sequence of encoded representations having the highest confidence scores.

9. The computer-implemented method of claim 8, wherein K is based on a predetermined ratio of encoded representations in the sequence of encoded representations to be masked.

10. The computer-implemented method of claim 9, wherein the predetermined ratio is equal to forty percent.

11. A system comprising:
    data processing hardware; and
    memory hardware in communication with the data processing hardware, the memory hardware storing instructions that when executed on the data processing hardware cause the data processing hardware to perform operations comprising:
    obtaining a sequence of encoded representations corresponding to an utterance;
    for each respective encoded representation in the sequence of encoded representations:

processing, using a scorer model, the respective encoded representation to generate a corresponding probability distribution over possible speech recognition hypotheses for the respective encoded representation; and assigning, to the respective encoded representation, a confidence score as a highest probability from the corresponding probability distribution over possible speech recognition hypotheses for the respective encoded representation;

based on the confidence scores assigned to the sequence of encoded representations, selecting, from the sequence of encoded representations, a set of unmasked encoded representations to mask;

generating a set of masked encoded representations by masking the selected set of unmasked encoded representations, wherein each masked encoded representation in the set of masked encoded representations corresponds to a respective one of the unmasked encoded representations in the selected set of unmasked encoded representations;

pre-training an audio encoder based on the set of masked encoded representations, wherein a speech recognition model comprising the pre-trained audio encoder is configured to generate a speech recognition result for a spoken utterance; and determining an utterance-level confidence score by averaging the confidence scores assigned to the set of masked encoded representations.

12. The system of claim 11, wherein the operations further comprise:

for each respective unmasked encoded representation in the selected set of unmasked encoded representations to mask, generating, using a quantizer, a corresponding target context vector for the respective unmasked encoded representation; and for each respective masked encoded representation in the set of masked encoded representations:
generating a corresponding contrastive context vector for the respective masked encoded representation; and
generating a contrastive loss based on the corresponding contrastive context vector and the corresponding target context vector generated for the respective unmasked encoded representation that corresponds to the respective masked encoded representation, wherein pre-training the audio encoder is further based on using the contrastive losses generated for the set of masked encoded representations.

13. The system of claim 12, wherein the operations further comprise:

for each respective unmasked encoded representation in the selected set of unmasked encoded representations to mask, generating, using a cluster module, a corresponding K-means cluster for the respective unmasked encoded representation; and for each respective masked encoded representation in the set of masked encoded representations, generating a cross-entropy loss based on the corresponding contrastive context vector and the corresponding K-means cluster generated for the respective unmasked encoded representation that corresponds to the respective masked encoded representation, and wherein pre-training the audio encoder is further based on using the cross-entropy losses generated for the set of masked encoded representations.

14. The system of claim 13, wherein the operations further comprise:

for each respective masked encoded representation in the set of masked encoded representations, determining a final training objective based on the contrastive loss and the cross-entropy loss, wherein pre-training the audio encoder is further based on the final training objectives generated for the set of masked encoded representations.

15. The system of claim 14, wherein the operations further comprise:

determining an utterance-level confidence score by averaging the confidence scores in the set of masked encoded representations; and weighting the final training objective based on the utterance-level confidence score, wherein pre-training the audio encoder is further based on the weighted final training objective.

16. The system of claim 13, wherein the operations further comprise extracting bottleneck features from the contrastive context vectors.

17. The system of claim 16, wherein the operations further comprise refining each corresponding K-means cluster using the extracted bottleneck features.

18. The system of claim 11, wherein selecting the set of unmasked encoded representations to mask comprises selecting the top-K encoded representations from the sequence of encoded representations having the highest confidence scores.

19. The system of claim 18, wherein K is based on a predetermined ratio of encoded representations in the sequence of encoded representations to be masked.

20. The system of claim 19, wherein the predetermined ratio is equal to forty percent.

* * * * *